R. C. HOLT.
Cultivator.
No. 104,154.
Patented June 14, 1870.
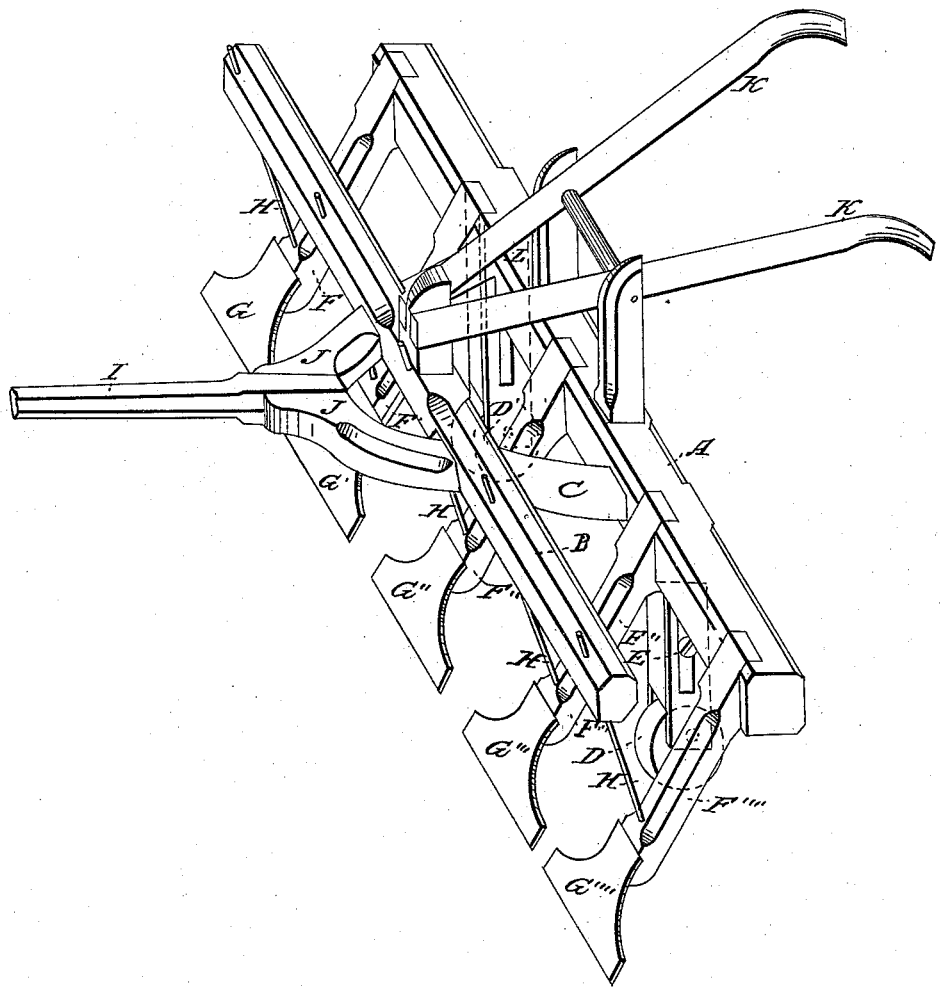

UNITED STATES PATENT OFFICE.

RUFUS C. HOLT, OF MOREHOUSE PARISH, LOUISIANA.

IMPROVED COTTON-CHOPPER.

Specification forming part of Letters Patent No. 104,154, dated June 14, 1870.

*To all whom it may concern:*

Be it known that I, RUFUS C. HOLT, of the parish of Morehouse, State of Louisiana, have invented certain Improvements in Implements or Machines for Chopping Out Cotton, which I call an "Improved Cotton-Chopper," of which the following is a specification.

My invention consists of the combination of a suitable frame that is mounted on wheels with a number of cutters in such a manner that when the machine is drawn across the rows of cotton-plants, the said cutters can be kept off the ground between the rows by the director or manager of it, and be brought into contact with it just before they reach the rows of plants, so as to cut or "chop" them out—to use the technical expression of the cotton-regions—and thus leave the plants intended to be left standing with proper intervals of vacant space between them, to insure a rapid growth and full yield of cotton.

The object of my invention is to reduce the labor and time that is required under the present plan or mode of effecting the operation of chopping out with hand-hoes by the substitution of a machine which will do it far more expeditiously, and thus to cheapen the cultivation of cotton.

The drawing gives a perspective view of my machine in complete form, as when ready for use.

A B C constitute the principal parts of the frame to which I have referred, and D D' two wheels on which it is mounted, which have their axes at the lower extremities of strong pendent standards E E', that are secured to the rear cross-beam, A, in such manner as to be adjustable within prescribed limits, with the view of affording a means for increasing or diminishing the space between the wheels and the frame, and of changing the relation of the wheels to said beam, and therefore to the frame as a whole, by moving the former forward or backward as circumstances may require. The wheels D D' may be made of solid form, as shown, or they may be of any other construction that taste or fancy may suggest. I shall probably, as a general rule, use open wheels with spokes and fellies, with a very broad tread or tire, as being lighter and less liable to sink in yielding or plowed ground.

F' F' F'' F''' F'''' are standards secured to the same cross-beam A, so as to project forward at an angle of about thirty degrees from a true vertical line. To these standards the cutters G G' G'' G''' G'''', which have a breadth of cutting-edge of sixteen inches, or thereabout, and taper toward their tops, as shown, or in any other manner that will secure well-adjusted proportions and symmetry of form, are secured in any proper way and by any sufficient means, so as to be maintained firmly in position and yet be readily removable whenever it is necessary to take them off to be replaced with others, or repaired, or for any other purpose whatsoever. These cutters may or may not be slightly curved, as shown, but as a general thing a slight curvature will increase their efficiency. At least this is my opinion at present, and until I ascertain to the contrary I shall act on that idea in making them. I may reduce the number of cutters to three, or increase them to eight, nine, or even ten, if I should deem it proper.

To re-enforce the standards F F' F'' F''' F'''', I employ brace-rods H, which, being secured thereto and to the front cross-beam, B, in any usual or suitable manner, substantially as shown, effectually hold the said standards in position and prevent them, under any ordinary circumstances, from being broken off.

The standards F F' F'' F''' F'''' are so adjusted on the beam A as to provide a space between the cutters of from two to three inches, so that, in the operation of the machine, the plants to be left standing will not be touched by the said cutters. In some cases I may make the standards F F' F'' F''' F'''' adjustable by connecting them to the beam A by means of articulating joints, so as to change their angle with respect to the ground, the adjustment being effected by shortening or lengthening the rods H, which, obviously, could easily be done by cutting screws on their upper ends and putting taps or nuts on the same, and by other equivalent means.

A tongue, I, is fitted in the hounds J, to which are attached the horses or mules which are employed to pull the machine; and a pair of handles, K, are secured at the rear of the frame, to enable the laborer who attends it to control its course when in use.

A mere glance at the invention is sufficient to indicate that in its practice or use it is drawn at right angles across the rows of cotton-plants, and hence I need only further state that the manager of it has but to press slightly on the handles K to keep the cutters off the ground between the rows of cotton, and to remove such pressure just before they (the cutters) reach each row, to let them fall to the ground to effect the chopping out of the plants at regular intervals throughout the whole field.

I claim as my invention—

The arrangement of the adjustable standards F F' F'' F''' F'''', brace-rods H, cutters G G' G'' G''' G'''', frames A B C, hounds J, tongue I, handles K, and wheels D D', when these several parts are constructed, united, and operate as herein desbribed, for the purpose set forth.

RUFUS C. HOLT.

Witnesses:
D. C. MORGAN,
C. T. DUNN.